Feb. 18, 1958  G. HERZOG  2,824,233
CONTROLLING SCINTILLOMETER TEMPERATURE
Filed Dec. 29, 1951
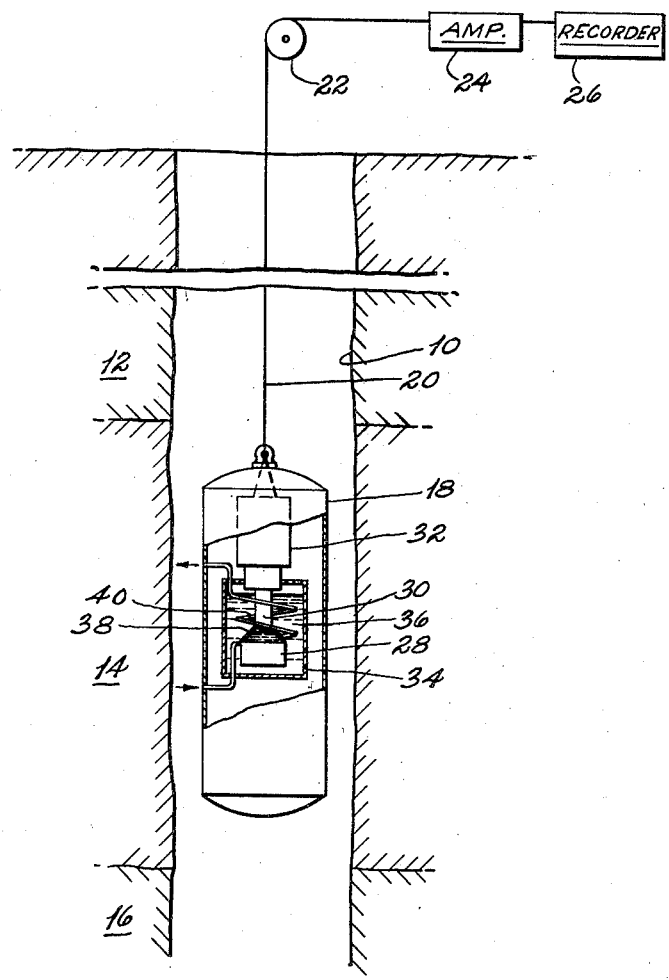
INVENTOR.
GERHARD HERZOG
BY
ATTORNEYS though the outer surface of the receptacle is still sufficiently cool to maintain the photo-cathode at a temperature well below the critical value. When the logging operation is completed, the instrument is pulled out of the hole.

United States Patent Office 2,824,233
Patented Feb. 18, 1958

2,824,233
CONTROLLING SCINTILLOMETER TEMPERATURE

Gerhard Herzog, Houston, Tex., assignor to The Texas Company, New York, N. Y., a corporation of Delaware Application December 29, 1951, Serial No. 264,203

13 Claims. (Cl. 250—71)

This invention relates to the measuring of penetrative radiation such, for example, as gamma rays or neutrons, by means of a scintillometer, and more particularly to a method and an apparatus by means of which a device of this type can be maintained at a pre-determined satisfactory working temperature in warm or hot locations such as when measuring penetrative radiation emitted by the earth formations surrounding a well or bore hole.

It is well known that the temperatures in most bore holes are considerably higher than those at the surface and temperatures exceeding 250° F. are not uncommon.

A typical scintillometer or scintillation detector comprises essentially a luminophor which may, for instance, be a crystal of sodium iodide, thallium activated, and a photosensitive device such as a photomultiplier tube, the output of which in the form of electrical pulses is led to a suitable recording device. It is known that the photo-cathode of the type 5819 photo-tube and most of the other commercial photomultipliers are limited to an ambient temperature of about 75° C. (167° F.) since temperatures exceeding this value tend to destroy the surface of the tube. Again, when a tube of this type is subjected to high temperatures, the thermal emission therein provides a high background and this background or noise frequently confuses or obscures the pulses which are produced by action of the gamma rays in the luminophor. It will be seen, therefore, that when a device of this type is used in a radioactivity well-logging instrument, some type of cooling or refrigeration should be used to maintain the temperature of the photo-tube at a value at which the tube will function satisfactorily during the radiation measuring operation.

It has been suggested that the scintillometer or at least the photo-tube be packed in cracked ice before the measuring operation but this is a considerable bother as it is necessary to disassemble the instrument, insert the cracked ice and then reassemble the device for each measuring operation. In accordance with the present invention, a substance is disposed in a zone around the temperature sensitive element of the scintillometer, i. e., the photo-cathode, this substance being a solid or a material which can be made a solid at the start of the measuring operation but which will melt during said operation so that the heat of fusion of the substance will maintain the photo-cathode at a reasonably low temperature. In one embodiment, water may be used as the cooling substance, the water being frozen just prior to, or being maintained frozen up to, the start of the measuring operation. The freezing may be accomplished by keeping the entire instrument or at least the temperature sensitive portion in cold storage, for example, in a deep freeze unit between measuring operations or, alternatively, the water can be frozen just prior to the measuring operation by circulating a suitable cooling medium through a tubular coil disposed in the water-containing zone around the photo-cathode. In another embodiment, the cooling material can be some substance which is a solid at normal surface temperatures, but which will be fluid after being subjected for some time to high temperatures such as may be encountered in a bore hole.

For a better understanding of the invention, reference may be had to the accompanying drawing in which the single figure is a vertical sectional view through a portion of a well or bore hole showing a radiation measuring instrument of the scintillometer type disposed therein.

Referring to the drawing, a bore hole 10 is shown as traversing several subsurface earth formations such as those indicated at 12, 14 and 16, and the bore hole may be cased or uncased since penetrative radiation such as gamma rays will pass through the conventional steel well casing with very little loss.

Shown within the bore hole 10 is a logging instrument indicated generally by a closed housing 18 suspended from the surface by means of a conductor cable 20. At the surface, the cable 20 passes over a suitable cable measuring reel or drum 22 and from there to an amplifier 24 the output of which is led to a recorder 26 which may be of the moving tape or film type. As is well known, the tape-driving means of the recorder may be synchronized with the depth measuring device 22 so that indications recorded on the tape can be correlated with the depths of the logging instrument in the hole.

Within the instrument housing 18 is a scintillometer comprising a luminophor 28 which, as has been stated hereinabove, may comprise a crystal of sodium iodide, thallium activated, and a photomultiplier tube 30, the cathode of which is exposed to the upper surface of the crystal 28. The photomultiplier tube 30 is connected to a suitable preamplifier 32, the output of which is connected in turn to the lower end of the cable 20. As is well known penetrative radiation such as gamma rays and neutrons from the formations surrounding the hole which strike and penetrate the luminophor crystal 28 will produce electrons and photons, the latter of which are detected by the cathode of the photomultiplier tube and amplified in the form of electrical pulses corresponding in number to the gamma rays or neutrons striking the luminophor. These pulses are again amplified by the device 24 and recorded in log form at 26 in well-known manner. Shown surrounding the crystal 28 and the photomultiplier tube 30 is a receptacle or container 34 adapted to hold a substance 36 for cooling the photomultiplier tube. The crystal 28 may be connected to the lower end of the tube 30 by means of a short conical member 38 which will prevent the substance 36 from entering the space between the crystal and the end of the tube. Preferably, this space within the conical member is filled with some suitable substance such as mineral oil which will provide a good optical link through which the photons will be transmitted from the crystal to the cathode of the tube.

Shown disposed within the zone surrounding the photomultiplier tube 30 is a tubular coil 40, the ends of which pass through the instrument housing 18 where they may, during the measuring operation, be closed by any suitable plugs, not shown.

In one embodiment of the invention, before the instrument is lowered into the bore hole, the ends of the coil 40 may be connected to a suitable refrigerating device which will circulate a coolant through the coil to freeze the substance 36, which, in this case may be water. It is understood, of course, that the receptacle 34 will be sufficiently thin to provide for expansion as the ice forms or that sufficient empty space be provided within the receptacle to take care of this expansion. When the water 36 has been frozen solid, the measuring instrument is run into the hole, usually to the bottom, and then pulled upwardly at a uniform speed past the earth formations, the variations in the penetrative radiation from the formations being recorded by the device 26. During this logging or measuring operation, the water will be melting and the temperature of the photo-multiplier tube 30 will remain constant as long as the water is changing from the solid to the liquid state.

If desired, the tubular coil 40 may be dispensed with and either the entire logging instrument 18 or the scintillometer portion thereof maintained for a sufficient time in cold storage such as in a deep freeze unit, prior to a measuring operation. The water 36 will, of course, be frozen during this period and will start to melt when the instrument is removed from the deep freeze unit and run into the bore hole.

In another embodiment of the invention, the cooling material 36 need not be water, but may be some other material which will normally remain solid at the temperatures encountered at the surface, and which will melt at subsurface temperatures, for example, hydrous disodium orthophosphate has a melting point of 34.6° C., a density of 1.5 gm./cc., and a heat of fusion of 102 cal./cc.$^{-1}$. The use of this or a similar material will, of course, eliminate the need for an outside refrigerant.

While they are many materials which can be used in the manner described above, following is a list of five which are particularly satisfactory.

| Materia | Melting Point, ° C. | Heat of Fusion, Cal./cc.$^{-1}$ |
| --- | --- | --- |
| Water | 0 | 80 |
| Hydrous disodium Orthophosphate | 34.6 | 102 |
| Sodium sulphate Decahydrate | 32.4 | 84 |
| Calcium chloride Hexahydrate | 29.9 | 68 |
| Zinc nitrate | 36.4 | 64 |

It will be seen that a method and an apparatus has been provided by means of which the temperature of a temperature-sensitive element such as the photomultiplier tube of a scintillation detector can be maintained at a value such that it will function satisfactorily even when the surrounding temperature is considerably higher than that at which the tube will otherwise cease to operate properly.

Obviously many modifications and variations of the invention as hereinbefore set forth, may be made without departing from the spirit and scope thereof and, therefore, only such limitations should be imposed as are indicated in the appended claims.

I claim:

1. The method of cooling a penetrative radiation well logging detector of the scintillometer type having a luminophor and a photomultiplier tube which comprises surrounding at least the cathode portion of said photomultiplier tube with a substance which remains solid at normal room temperatures but which will melt at elevated temperatures which may be incurred during the use of the detector for measuring said radiation.

2. The method described in claim 1 in which said substance is hydrous disodium orthophosphate.

3. The method described in claim 1 in which said substance is sodium sulphate decahydrate.

4. The method described in claim 1 in which said substance is calcium chloride hexahydrate.

5. The method described in claim 1 in which said substance is zinc nitrate.

6. The method of measuring penetrative radiation at temperatures higher than normal room temperature in a bore hole which comprises subjecting to said radiation a body which upon bombardment produces photons, exposing to said photons a photosensitive device to convert said photons to electrical pulses, recording the intensity of said pulses and surrounding said photosensitive device with a substance which remains solid at normal room temperature but which will melt during the operation of measuring the radiation at said higher temperatures.

7. The method of measuring penetrative radiation at temperatures higher than normal room temperature in a bore hole which comprises subjecting to said radiation a body which produces electrons upon bombardment by said radiation and which electrons in turn produce photons, exposing to said photons a photosensitive device to produce electrical pulses, maintaining said photosensitive device in heat exchange relation with a coolant, freezing said coolant into a solid block prior to the start of the measuring operation by circulating a cooling medium through and in heat exchange relation with said coolant, utilizing the heat of fusion of the coolant material to maintain said photosensitive device at a predetermined temperature during the measuring operation, and recording the intensity of said pulses.

8. A device for measuring penetrative radiation at elevated temperature in a bore hole comprising a scintillation detector having a luminophor and a temperature sensitive photo-cathode tube, and means for maintaining a predetermined temperature in a zone around said tube, said means comprising a receptacle substantially enclosing said tube and a substance in said receptacle adapted to be frozen just prior to the radiation measuring operation and having the property of remaining solid at normal room temperature and melting during the said radiation measuring operation whereby the heat of fusion of the substance is utilized to maintain said predetermined temperature in said photo-cathode tube.

9. The method described in Claim 7 in which said coolant is water.

10. An apparatus for cooling a well logging detector that comprises an instrument housing, said detector disposed within said housing, a sealed container also disposed within said housing, water disposed within said sealed container, expansion means to permit said water to expand within said sealed container, a heat exchanger disposed in contact with said water, a source of refrigerant external to said instrument housing, sealed means for conducting said refrigerant from said source to said heat exchanger, and sealed means for conducting the spent refrigerant from said heat exchanger to the outside of said housing.

11. An apparatus for cooling a well logging device that comprises an instrument housing, said device disposed within said housing, a sealed container also disposed within said housing, a freezable liquid disposed within said sealed container, expansion means to permit said liquid to expand within said sealed container, a heat exchanger disposed in contact with said liquid, a source of refrigerant external to said instrument housing, sealed means for conducting said refrigerant from said source to said heat exchanger for freezing said liquid, and sealed means for conducting the spent refrigerant from said heat exchanger to the outside of said housing.

12. In the method of conducting a radioactive well log involving the use of a sealed logging instrument including therein a temperature sensitive radiation detector device which is temperature stabilized through the use of a freezable substance positioned in heat exchange relation with said device within the logging instrument, the improvement comprising the preliminary step of freezing said substance in place within the sealed logging instrument prior to conducting a log by introducing a fluid coolant into the sealed logging instrument and circulating it through the instrument in heat exchange relation with said freezable substance and subsequently passing the logging instrument through the bore hole in regions of elevated temperature and detecting radiation therewith while the temperature sensitive detector is temperature stabilized by the heat of transition of said frozen substance.

13. In the method of conducting a well log involving the use of a sealed logging instrument including therein a temperature sensitive device which is temperature stabilized through the use of a freezable substance positioned in heat exchange relation with said device within the logging instrument, the improvement comprising the preliminary step of freezing said substance in place within the sealed logging instrument prior to conducting a log by introducing a fluid coolant into the sealed logging instrument and circulating it through the instrument in heat exchange relation with said freezable substance, and subsequently passing the logging instrument through the bore hole in regions of elevated temperature and conducting a log while the temperature sensitive device is temperature stabilized by the heat of transition of said frozen substance.

References Cited in the file of this patent

UNITED STATES PATENTS

| | | |
|---|---|---|
| 2,433,554 | Herzog | Dec. 30, 1947 |
| 2,711,084 | Bergan | Aug. 30, 1952 |

OTHER REFERENCES

"Scintillation Counter for the Detection of —Particles," Sherr, Rev. of Sci. Inst., vol. 18, No. 10, October 1947; pp. 767–770.

"Thallium Halide Crystal Counter," Hofstadtes, Physical Review, vol. 72, October 1947; pp. 1120–21.

"Radioactivity and Nuclear Physics," Cork, pub. by Van Nostrand Co., Inc., New York, N. Y., second edition, June 1950; pp. 60–61.

Mellor: "Comprehensive Treatise on Inorganic and Theoretical Chemistry," vol. 2, pub. by Longmans, Green & Co., 1922; pp. 667–672.